United States Patent [19]

Batts et al.

[11] Patent Number: 6,123,954
[45] Date of Patent: Sep. 26, 2000

[54] APPARATUS AND METHOD FOR INHIBITING MICROBIAL GROWTH IN AN AQUEOUS MEDIUM

[75] Inventors: Gregory N. Batts, Bushey; Karen Leeming, Wealdstone; Christopher P. Moore, Harrow, all of United Kingdom

[73] Assignee: Eastman Kodak Company, Rochester, N.Y.

[21] Appl. No.: 08/922,736

[22] Filed: Sep. 3, 1997

[30] Foreign Application Priority Data

Sep. 4, 1996 [GB] United Kingdom .................. 9618378

[51] Int. Cl.⁷ .......................... A01N 25/00; A01N 25/08; C12M 1/00
[52] U.S. Cl. ...................... 424/409; 424/405; 435/283.1; 514/359
[58] Field of Search ..................... 424/405, 409; 435/287, 283.1; 514/359

[56] References Cited

U.S. PATENT DOCUMENTS

| 4,298,475 | 11/1981 | Gartner | 210/266 |
|---|---|---|---|
| 4,902,432 | 2/1990 | Kuno | 210/764 |
| 5,104,649 | 4/1992 | Jansson et al. | 424/78.31 |

FOREIGN PATENT DOCUMENTS

| 0 392 443 | 10/1990 | European Pat. Off. . |
| 0 678 478 | 10/1995 | European Pat. Off. . |
| 0 733 303 | 9/1996 | European Pat. Off. . |
| 2643827 | 9/1990 | France . |

OTHER PUBLICATIONS

Patent Abstracts of Japan, vol. 010, No. 239 (C–367), Apr. 14, 1986.
JP 61 072098A (Keiyoo:KK), Apr. 14, 1986.

*Primary Examiner*—David M. Naff
*Assistant Examiner*—Deborah K. Ware

[57] ABSTRACT

A method of inhibiting microbial growth in wash water contained in a photoprocessing system. The method comprises placing in the wash water an apparatus comprising a pump with an attached permeable container and an inlet and outlet means for the wash water. The permeable container includes a biocide immobilized on a support. The wash water as it is pumped through the pump passes through the container and makes contact with the immobilized biocide in order to inhibit microbial growth in the wash water. The apparatus is self-contained and may be placed in a reservoir of an aqueous medium to be treated.

9 Claims, 3 Drawing Sheets

APPARATUS AND METHOD FOR INHIBITING MICROBIAL GROWTH IN AN AQUEOUS MEDIUM

FIELD OF THE INVENTION

The invention relates to an apparatus and method for inhibiting microbial growth in an aqueous medium.

BACKGROUND OF THE INVENTION

Microbial growth occurs in many systems in which aqueous media such as water, aqueous solutions and aqueous dispersions are employed.

For example, significant biofouling can occur in many areas of photoprocessing systems and, in particular, where low flow rate washes and water recycling is used. The problem may be overcome by adding biocides to the wash water tanks when bacterial biofilm formation becomes evident visually. However at this point the biocides may not work and even at quite high concentrations are not particularly effective because the bacteria have attached to surfaces to form colonies which have built up in layers. Hence, any biocide in solution can only reach the outer biofilm layer and not the inner layers of the biofilm which are protected. Furthermore, widespread use of such biocides is not desirable because they are relatively expensive and toxic chemicals which require specialised disposal to protect the environment.

Alternative methods of inhibiting bacterial growth in aqueous media involve the gradual release of a biocide through interaction with water e.g. by leaching.

U.S. Pat. No. 4,552,591 describes a biocidal composition for inhibiting microbial growth in oil field waters which comprises a biocide and a solid, particulate adsorbent therefor. The biocides are conventional water soluble compounds traditionally used in the treatment of oil field waters e.g. 2-methyl-4-isothiazolin-3-one which are adhered to a known adsorbent e.g. diatomaceous earth. The compositions avoid the personal and environmental contamination which can result from spillage of the biocide used previously in liquid form. After addition to oil field waters, such compositions release the biocide through leaching.

PROBLEM TO BE SOLVED BY THE INVENTION

A problem associated with the prior art methods and materials for inhibiting bacterial growth in aqueous media using biocides is that biocide is released in the media.

Furthermore, there is a need for a method and materials in which the biocide is only used on demand when the bacteria are present.

Methods and materials which reduce the exposure of operators to toxic biocides are also sought.

There is a need for self-contained treatment apparatus which can be placed directly into a resevoir of the aqueous medium to be treated.

SUMMARY OF THE INVENTION

The invention provides apparatus for use in an aqueous medium for inhibiting microbial growth in the aqueous medium comprising a pump for pumping a liquid having liquid inlet means and outlet means and, a permeable container holding biocide immobilised on a support, said permeable container being attached to said pump such that, when the apparatus is in use, liquid pumped through the pump passes through the container and contacts the immobilised biocide.

The invention also provides a method of inhibiting microbial growth in an aqueous medium comprising placing the apparatus of the invention in the aqueous medium and pumping the aqueous medium through the container holding the biocide immobilised on a support.

ADVANTAGEOUS EFFECT OF THE INVENTION

The invention removes the need for conventional dosing of biocides in solution, either directly or by gradual release, which has many drawbacks.

The biocide is only used on demand when the bacteria are present.

The direct exposure of operators to toxic biocides is minimised.

The apparatus can be placed directly into a tank of the aqueous medium to be treated and biogrowth control is achieved by "in-tank" circulation of the aqueous medium. No additional plumbing is required to remove aqueous medium from the tank for separate treatment.

DETAILED DESCRIPTION OF THE INVENTION

Figure 1:
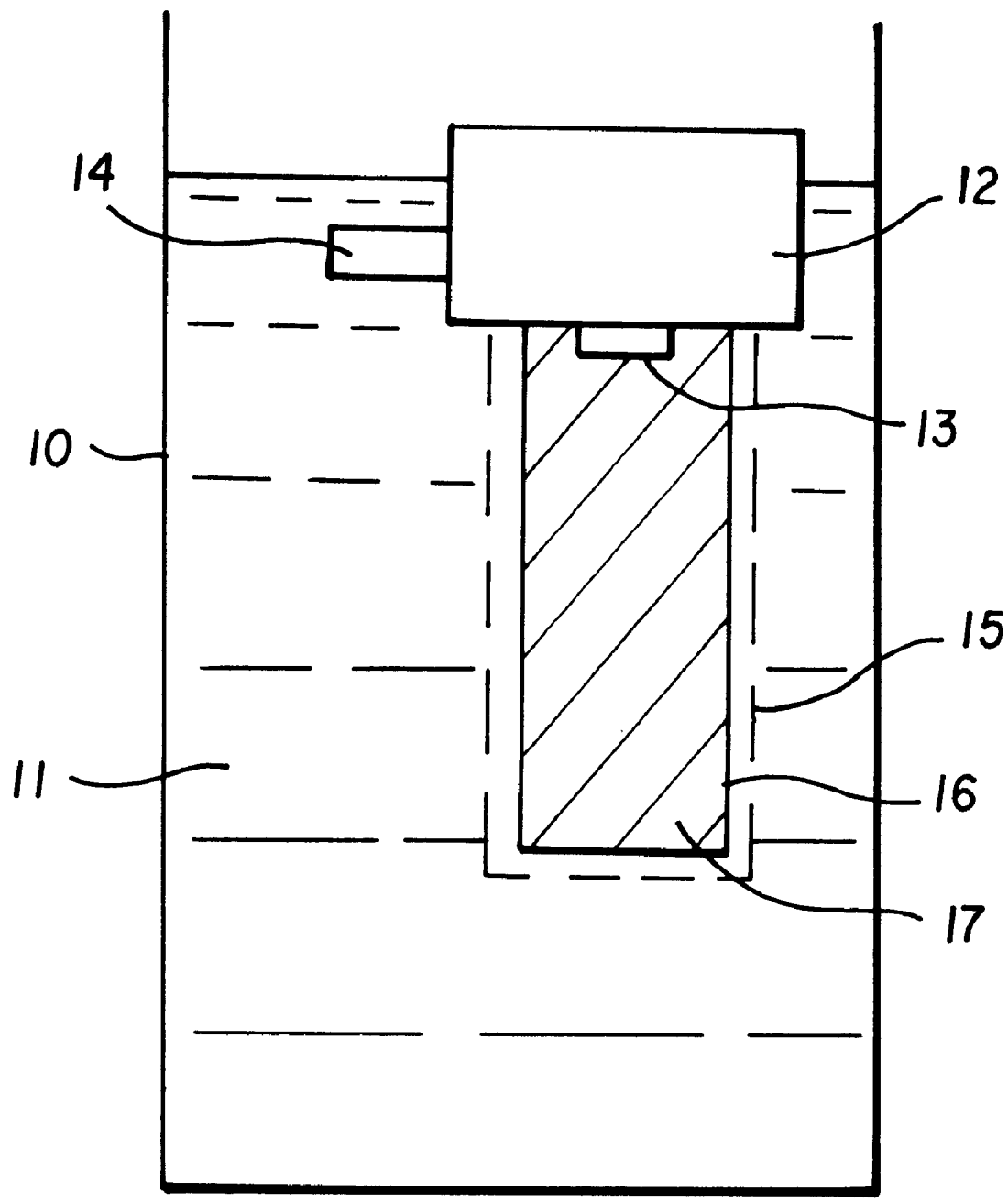
FIG. 1 is a schematic representation of the use of apparatus in accordance with the invention.

The apparatus of the invention is suitable for use in a tank of the aqueous medium to be treated and biogrowth control can be achieved by treatment of the aqueous medium within the tank. No additional plumbing is required to remove aqueous medium from the tank for separate treatment.

Preferably, the apparatus is submergable i.e. capable of being operated below the surface of the aqueous medium. Preferably, the pump is hermetically sealed.

A permeable container holding biocide immobilised on a support may be attached to the pump over one or more of the inlet and outlet of the pump. In a preferred embodiment of the invention, the permeable container is attached to the pump over the inlet of the pump such that liquid pumped through the pump passes through the container and contacts the immobilised biocide before entering the pump.

The apparatus may comprise means for attaching it to the wall of a receptacle in which the aqueous medium is held e.g. one or more suction caps or a clamp.

The apparatus may take the form of a modified aquarium pump. A typical aquarium pump comprises a hermetically sealed pump having an inlet and an outlet. A permeable container is attached to the pump over the inlet. For use in an aquarium, the container is filled with a filter material such that, when the submerged pump is operated, water drawn through the permeable container passes through the filter before being circulated by the pump. Apparatus in accordance with the invention can be formed by replacing the filter material with biocide immobilised on a support.

The support may take a variety of forms e.g. particulate, sheet or fibre. It may be porous or non-porous.

Examples of biocide immobilised on a support are described in our co-pending European Patent Applications Nos. 96200601.1 and 96200605.2 and in U.K. Patent Application No. 9615944.7.

A preferred biocidal material comprises a biocide immobilised on a support wherein the biocide has a log P value of at least 1.5, the support has a hydrophobic surface and the biocide is immobilised on the hydrophobic surface by hydrophobic exclusion.

Suitable biocides have a log P value of at least 1.5 wherein P represents the partition coefficient between n-octanol and water defined as follows $$P = \frac{[\text{biocide}]_{octanol}}{[\text{biocide}]_{water}}$$

Log P is a well known term used in literature on biocides. As used herein, it provides a measure of the hydrophobicity of the biocide.

Any known biocide meeting the hydrophobicity requirement or a known biocide which has been hydrophobically modified to meet the requirement may be used.

Suitable types of biocide include those described in "*Microbiocides for the Protection of Materials*", W. Paulus, published by Chapman Hall, 1993. They are agents capable of killing or inhibiting the multiplication of microorganisms such as bacteria, yeasts, fungi, algae and lichens. Examples include heterocyclic N,S compounds, compounds with activated halogen groups and quaternary ammonium salts.

Preferred biocides include those currently employed in the treatment of photoprocessing systems e.g. isothiazolinones.

Examples of isothiazolinone biocides are those having the structure

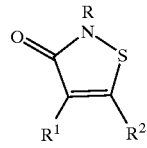

wherein
  R represents hydrogen, alkyl, aryl, alkaryl and aralkyl; and,
  $R^1$ and $R^2$ independently represent hydrogen, halogen, alkyl, or $R^1$ and $R^2$ taken together represent the atoms necessary to complete a fused carbocyclic ring, preferably a 5- or 6-membered ring e.g. a benzene ring;
  provided that R, $R^1$ and $R^2$ are chosen so that the log P value of the compound is at least 1.5.

Preferred biocides include those having the following stuctures:

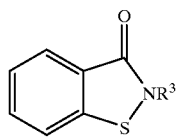

wherein $R^3$ is an alkyl group having from 4 to 20 carbon atoms or an aryl group having from 6 to 20 carbon atoms;

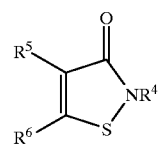

wherein $R^5$ and $R^6$ are selected from hydrogen and halogen, and $R^4$ is an alkyl group having from 5 to 20 carbon atoms; and,

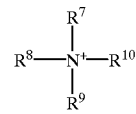

wherein each of $R^7$, $R^8$ and $R^9$ is hydrogen or an alkyl group providing a total of from 2 to 20 carbon atoms; $R^{10}$ is substituted or unsubstituted alkyl or aryl e.g. phenoxyethyl; and, Y is any suitable counter anion e.g. halide.

Specific examples of commercially available isothiazolinone biocides include

Proxel™ (manufactured by Zeneca):

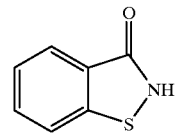

Promexal™ (manufactured by Zeneca):

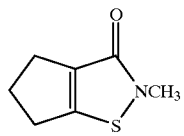

Kathon™ (manufactured by Rohm and Haas):

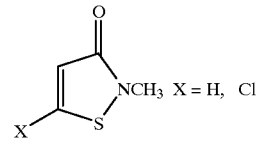

Other commercially available biocides are: Bronopol™ (manufactured by Boots):

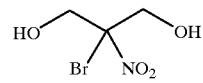

Domiphen™ bromide (manufactured by Ciba-Geigy):

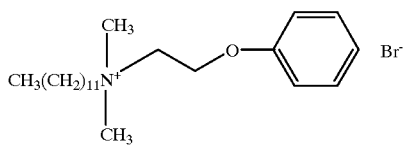

Vantocil™ (manufactured by Zeneca):

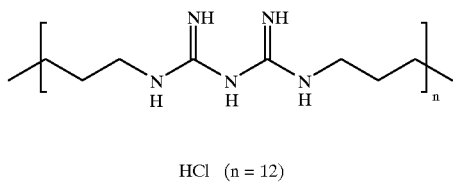

HCl (n = 12)

Densil S™ (manufactured by Zeneca):

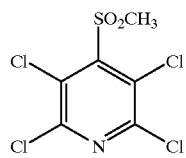

Biocides which are hydrophobically modified Proxel™ and Kathon™ have been prepared having the following structures:

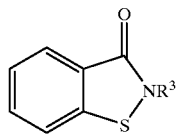

$R^3$=—$(CH_2)_7CH_3$ (Compound 1)
$R^3$=—$(CH_2)_{15}CH_3$ (Compound 2)

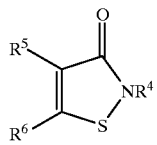

$R^4$=—$(CH_2)_7CH_3$, $R^5$=H, $R^6$=Cl (Compound 3)
$R^4$=—$(CH_2)_{17}CH_3$, $R^5$=H, $R^6$=Cl (Compound 4)
$R^4$=—$(CH_2)_7CH_3$, $R^5$=H, $R^6$=H (Compound 5)
$R^4$=—$(CH_2)_7CH_3$, $R^5$=Cl, $R^6$=Cl (Compound 6)

Many commercially available biocides are soluble in aqueous media and an increase in their hydrophobicity is required to render them suitable for immobilisation by hydrophobic exclusion.

It is essential that biocides having a log P of at least 1.5, preferably at least 2.0, are used if immobilisation is to be achieved by hydrophobic exclusion. Biocides having a log P less than 1.5 can become detached from the support and contaminate the aqueous medium. When this happens, the advantages of the invention are not realized since bacterial growth is inhibited through the release of the biocide in common with earlier known systems.

Hydrophobic polymers suitable for use as support materials include any inert, water insoluble polymers.

Examples of suitable polymers are ethenic polymers including polyolefins, polystyrene, polyvinyl chloride, polyvinyl acetate and acrylic polymers; and polymers formed by condensation reactions including polyesters, polyamides, polyurethanes, polyethers, epoxy resins, amino resins and phenol-aldehyde resins.

Specific examples of support materials are Amberlite™ XAD-4 and XAD-2 resin beads which are both highly porous, cross-linked polystyrene, and XAD-7 resin beads formed from a crosslinked polyacrylate.

The support may take a variety of forms e.g. particulate, sheet or fibre. It may be porous or non-porous.

The biocide is immobilised on the support by a hydrophobic exclusion mechanism. Immobilisation may be carried out by addition of the dry support e.g. a resin to a solution of the biocide in an organic solvent e.g. tetrahydrofuran (THF), followed by slow addition of a similar volume of water. The support may be left in contact with the solution for a period of time e.g. 18 hours allowing most of the organic solvent to evaporate. Subsequent drying of the support leaves the biocide adsorbed thereto.

A variety of commercial and hydrophobically-modified biocides have been studied. Partition coefficients between octanol and water have been determined at 25° C. by UV/visible absorption. First, the calibration curve of each biocide was determined as optical density (ODabs) versus concentration of biocide in $\mu g/g$ (ppm) of water for the predominantly water-soluble materials and $\mu g/g$ of octanol for the predominantly oil-soluble biocides.

A known amount of biocide was placed in a glass vessel containing either 10 ml of water or 10 ml of octanol depending on the solubility of the biocide. An equal volume of the other solvent was added and the glass vessel sealed. The vessel was shaken vigorously for a few minutes and then every few hours for more than 48 hours. Each mixture was placed in a sealed separating funnel and left for a further 24 hours. The water phase of each mixture was removed and the UV/visible spectra run against water with appropriate dilutions to bring absorbance between 0 and 1.5 for the commercial biocides and the octanol fractions were examined for the hydrophobically modified biocides.

The following partition coefficients shown in Table 1 were determined.

TABLE 1

| Biocide | P |
|---|---|
| Promexal ™ | ~4.5 |
| Vantocil ™ | ~0.3 |
| Domiphen ™ | ~50 |
| Kathon ™ | ~1 |
| Proxel ™ | ~0* |
| Compound 1 | >330 |
| Compound 3 | >560 |
| Compound 2 | >130 |
| Compound 4 | >480 |

* i.e. there was almost no biocide in the oil phase.

Alternatively, the biocidal material held in the permeable container may comprise an organic biocide immobilised on a polymeric support wherein the support is water-insoluble and the biocide is covalently bound to the support by a hydrolytically stable covalent linkage.

Biocides can be attached to a polymer support by covalent linkages that are variable in length and chemistry.

Suitable types of biocide include those described above in "Microbiocides for the Protection of Materials", W. Paulus, published by Chapman Hall, 1993.

Preferred biocides include those currently employed in the treatment of photoprocessing systems e.g. isothiazolinones.

Examples of isothiazolinone biocides are those having the structure

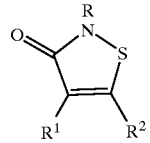

wherein
R represents hydrogen, alkyl, aryl, alkaryl and aralkyl; and,
$R^1$ and $R^2$ independently represent hydrogen, halogen, alkyl, or $R^1$ and $R^2$ taken together represent the atoms necessary to complete a fused carbocyclic ring, e.g. a benzene ring.

Specific examples of commercially available isothiazolinone biocides include Proxel™ and Promexal™ (both manufactured by Zeneca) and Kathon™ (manufactured by Rohm and Haas).

Polymers suitable for use as support materials include any inert, water-insoluble polymers.

Suitable types of polymer include condensation polymers such as polyurethanes, polyamides and polyureas; and polymers derived from one or more ethylenically unsaturated monomers such as polystyrene and polymethacrylates.

Preferably, the polymer comprises functional groups e.g. amide, urethane or ester groups which facilitate the covalent attachment of the biocide.

A number of different ways of covalently attaching molecules to polymers are known. In the present invention, only those ways which result in a hydrolytically stable covalent linkage are suitable i.e. the biocide is not released from the polymer by hydrolysis. References teaching different attachment chemistries include J M Woodley, "*Solid Supports and Catalysts in Organic Synthesis*", Ellis Horwood, Chapter 9, 1992 and International Patent Application PCT/EP92/00129. A hydrolytically stable covalent linkage may comprise one or more alkylene groups interrrupted or terminated with one or more urethane, amide or ester groups.

In general terms, one or both of the biocide and polymer can be modified to react with the other. For example, a modified version of a known isothiazolinone biocide can be prepared in which the nitrogen atom bears a hydroxyalkyl group. The hydroxy group is available for reaction with a suitable functional group carried by the polymer. For example, a polyurethane can be modified by reaction with an alkylene diisocyanate to provide isocyanate groups pendant from the polymer backbone. Reaction of the modified isothiazolinone with the modified polyurethane results in the biocide being covalently attached to the polymer via a hydrolytically stable covalent linkage.

Polymer support materials can be provided in different forms e.g. sheets, fibres or particles. They may be porous or non-porous.

Alternatively, a biocidal material held in the permeable container may comprise a biocide and an inorganic carrier wherein the inorganic carrier is a porous inorganic polymer network in which the biocide is immobilised.

Suitable inorganic polymer networks include those derived from sol-gel materials, silicon nitride, metal esters e.g. acetates, nitrates, phosphates and ormosils (organically modified silicates).

Examples of suitable materials are referred to in "Sol-gel Science", by C. J. Brinker and G. W. Scherer, Academic Press, 1990, Chapters 2–3.

The preparation of inorganic e.g. silica glasses through the low temperature "sol-gel" synthesis is known. For example, see Chem. Rev. 1990, 90, 33–72 "The Sol-Gel Process" by L. L. Hench and J. K. West.

An amorphous matrix of the glassy material may be prepared by the room temperature polymerisation of suitable monomers, usually metal alkoxides. The polymerisation of metal alkoxide mixtures results in a transparent porous solid (xerogel) with surface areas of up to hundreds of square metres per gram and having small pores e.g. from 0.5 to 500 nm. The low temperature glass synthesis allows doping of the inorganic glass with organic molecules e.g a chemically sensitive dye.

The sol-gel glass has a cage-like porous molecular structure in which a single doping molecule can be isolated in an individual cage, even at high concentrations of additive. Molecules trapped in sol-gel glasses can interact with diffusible solutes or components in an adjacent liquid or gas phase in the pore space.

The sol-gel matrix may comprise one or more of $SiO_2$, $TiO_2$ and $ZrO_2$. In a preferred embodiment of the invention, a $SiO_2/TiO_2$ sol-gel matrix is used. Preferably, the mole ratio of Si:Ti in the sol-gel glass is from 90:10 to 50:50, more preferably from 80:20 to 60:40.

Suitable types of biocide include those described in "*Microbiocides for the Protection of Materials*", W. Paulus, published by Chapman Hall, 1993. They are agents capable of killing or inhibiting the multiplication of microorganisms such as bacteria, yeasts, fungi, algae and lichens. Examples include heterocyclic N,S compounds, compounds with activated halogen groups and quaternary ammonium salts.

Preferred biocides include those currently employed in the treatment of photoprocessing systems e.g. isothiazolinones.

Many commercially available biocides are soluble in aqueous media and an increase in their hydrophobicity is required to convert them into the preferred hydrophobic compounds for use in preparing the biocidal material wherein the biocide is immobilised in a porous inorganic polymer network. Preferred biocides include the biocides described above suitable for immobilisation by hydrophobic exclusion.

Preferably, the amount of biocide used is from 5 to 35 mole percent, more preferably from 20 to 30 mole percent based on the metal alkoxide or other precursor used to construct the inorganic polymer network.

Preferably, the inorganic polymer network is coated on a support. Preferred support materials are those to which the inorganic polymer readily adheres.

Inorganic support materials are advantageous. Many provide the additional benefits of low cost and physical robustness. Suitable materials include pumice, clay, sand, gravel, chalk, zeolites and glass. Such materials give the further advantage of easy disposal and are potentially more stable over wide pH ranges than organic polymer-based systems.

Polymers suitable for use as support materials include any inert, water insoluble polymers having appropriate surface properties. Preferably, such polymer supports have a non-crystalline surface. Preferably, the polymer supports have a hydrophilic surface comprising groups such as —OH and —COOH.

Examples of suitable types of polymer from which suitable supports can be derived include ethenic polymers including polyolefins, polystyrene, polyvinyl chloride, polyvinyl acetate and acrylic polymers; and polymers formed by condensation reactions including polyesters, polyamides, polyurethanes, polyethers, epoxy resins, amino resins and phenol-aldehyde resins.

The support may take a variety of forms e.g. particulate, sheet or fibre. It may be porous or non-porous.

The thickness of the inorganic polymer network coating on the support may be from 10 nm to 10 μm, preferably from 50 nm to 5 μm.

In accordance with one method of preparing the biocidal material, a solution of the biocide is made in an organic solvent e.g. tetrahydrofuran or alcohol. The biocide solution is mixed with an alkoxide sol-gel forming pre-cursor. The pre-cursor containing the biocide may be coated on a support if required by any conventional coating means e.g. dipping, spinning and spraying. The pre-cursor containing the biocide is left for some hours e.g. from 4 to 6 hours, before removing the solvent, preferably under reduced pressure. Drying is preferably carried out in a vacuum oven at a temperature from 60 to 100° C.

The invention is of particular use in photoprocessing systems. Such systems comprise stages for developing, fixing, bleaching and washing an exposed photographic material. Each stage requires apparatus for applying the appropriate aqueous processing solution to the photographic material. The apparatus may comprise means for supplying, removing and, possibly, recirculating such solutions.

The method of the invention may be used to inhibit microbial growth in the wash water or other solutions used in a photoprocessor.

The apparatus is particularly useful in small and size restricted environments e.g. minilabs for processing colour photographic film and paper, and X-ray film processors.

FIG. 1 is a schematic representation of the use of apparatus in accordance with the invention.

A tank 10 e.g. a photoprocessor tank contains an aqueous solution 11 e.g. a wash water. Submerged in the aqueous solution is an apparatus in accordance with the invention comprising a hermetically sealed pump 12 which is connected to a power supply (not shown). The pump 12 has an inlet 13 and an outlet 14. A permeable container 15 in the form of a perforated cylindrical sleeve is connected to the pump 12 such that it surrounds the inlet 13. The container 15 is filled with a sealed nylon mesh bag 16 containing polymer beads 17 having a biocide immobilised thereon. The bag 16 covers the inlet 13.

In operation, the pump 12 is started. Aqueous solution 11 is drawn through the wall of the permeable container 15, through the bag 16 coming into contact with the immobilised biocide and into the pump inlet 13. The treated solution is returned to the tank through the pump outlet 14.

The invention is further illustrated by way of example as follows.

Preparation of Immobilised Biocide

An isothiazolinone biocide mixture (80 g; Compound 5, 4 wt. %, Compound 3, 83 wt. % and Compound 6, 11 wt. %) was obtained following the procedures described in EP-A-0 095 907. The mixture was divided into two equal portions and dissolved in tetrahydrofuran (THF) (2×1.0 L) in two 5 L beakers. Amberlite™ XAD-4 resin beads (2×400 g) were added to each beaker with agitation provided by an overhead stirrer. Water (2×1.0 L) was added dropwise whilst maintaining stirring at 400–500 rpm. on completion of the addition the stirring rate was lowered to 300–400 rpm and maintained for about 20 hours. The resin was collected by filtration, washed with water (0.5 L) and transferred to a vacuum oven where it was dried at about 80° C. for 4 hours. The immobilised biocide was obtained as beige beads (1.046 Kg), corresponding to a biocide loading of 7.7%. The presence of biocide was confirmed by IR, MS and elemental analysis.

EXAMPLE 1

50 g of the active beads were placed in a nylon mesh bag and plastic ties were used to ensure that no beads could escape from the bag. The bag and its contents were autoclaved at 120° C. for about 20 minutes to kill any residual microorganisms.

A "Quick-Filter 201" aquarium pump distributed by Rolf C Hagen (Art. No. A-561) was employed. A plastic tank and lid were used to hold the aqueous medium to be treated.

The submergable pump including its removable permeable container for holding the nylon mesh bag, the plastic tank and its lid were soaked in 80% ethanol for 20 minutes to sterilise them and then removed and left to dry overnight in a cabinet in filter sterilised air.

The bag containing the active beads was placed inside the permeable container which was then attached to the pump. The tank was filled with 3.5 litres of sterile water, the pump was placed inside the tank in the water and the lid was sealed on the tank. The power supply for the pump passed out through a plastics foam bung in the lid of the tank, ensuring that the contents of the tank remained free from accidental contamination.

The sterile water was then inoculated with an aliquot of a pre-prepared bacterial culture (*Pseudomonas aeruginosa*) to give a known number of colony forming units (cfu) per ml in the tank.

At time zero a small aliquot of the bacterial culture was removed from the tank for further counting/analysis and the equipment started. A turnover volume of about 8 litres per minute was achieved. Further aliquots were removed from the tank at time intervals of 1, 2, 3, 4, 5, 6, 7, 8 and 24 hours and after dilution of these samples viable bacterial counts were obtained from Miles and Misra drop plates. These data are summarised in the growth curve given in FIG. 1.

The number of viable bacteria present in this system was reduced to below the detectable limit (16 cfu per ml) within 8 hours. A bactericidal effect, indicated by a reduction in the number of viable bacteria, being evident within the first two hours of the experiment.

EXAMPLE 2

Figure 2:
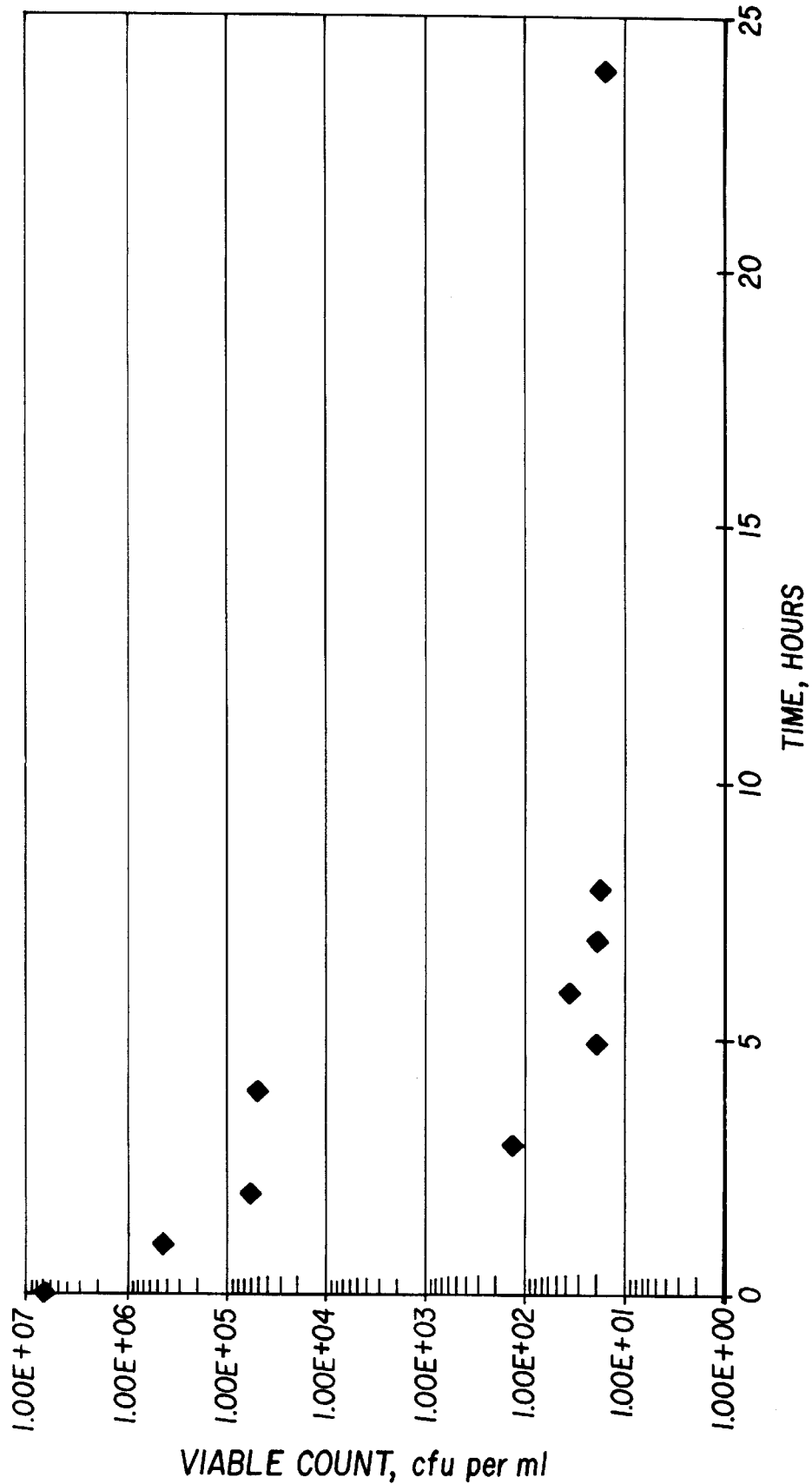
FIG. 2 is a graphical representation of results achieved using the invention in accordance with Example 1 described hereafter.
Figure 3:
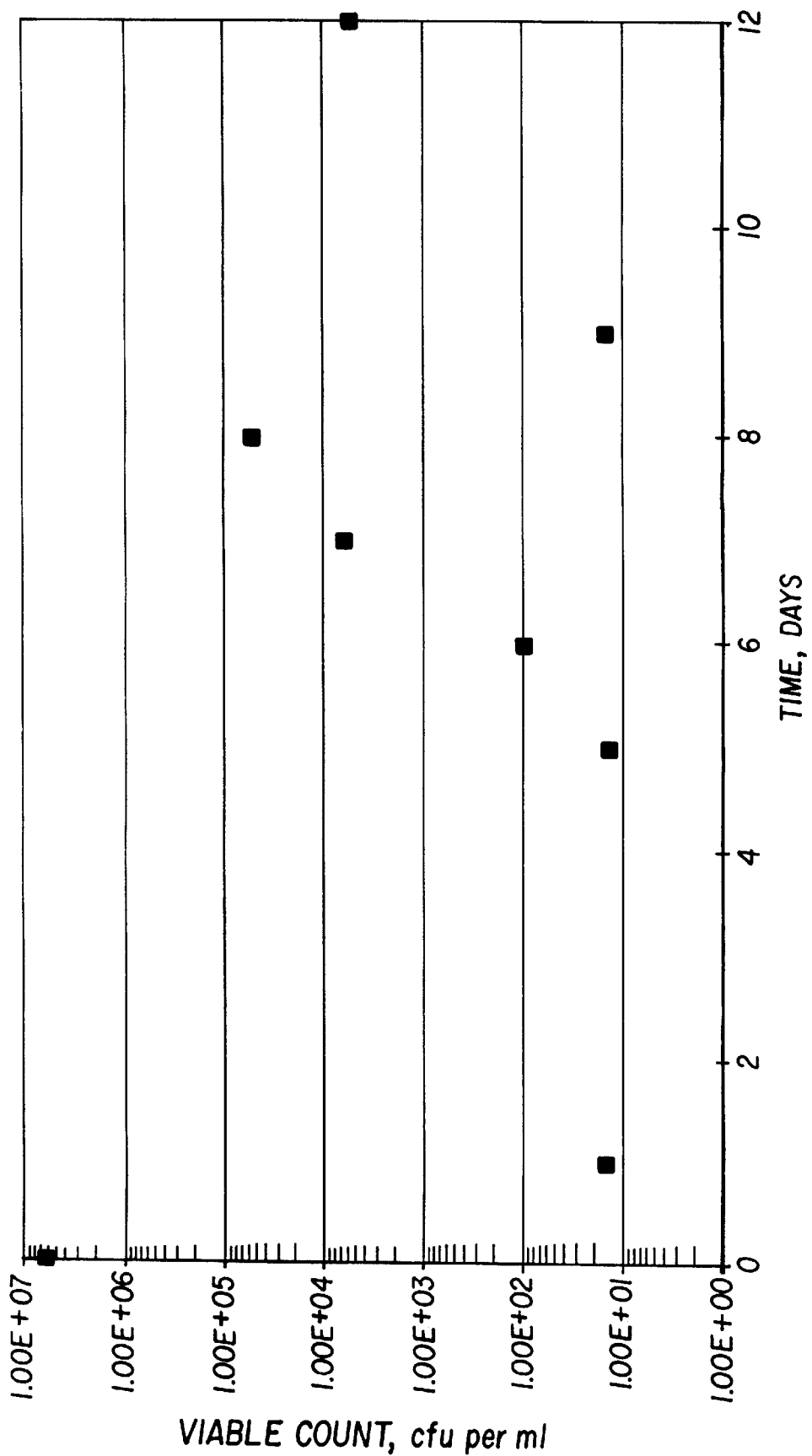
FIG. 3 is a graphical representation of results achieved using the invention in accordance with Example 2 described hereafter.

In a continuation of Example 1, the pump was left on for a further 11 days. Aliquots were removed from the tank at time intervals of 5, 6, 7, 8, 9, and 12 days and after dilution of these samples viable bacterial counts were obtained from Miles and Misra drop plates. These data are summarised in the growth curve given in FIG. 2.

The number of viable bacteria remained below the detectable limit for 5 days and after 12 days a bacteriostatic effect was still being exerted. It has been shown that this equipment is capable of significantly limiting the growth of bacteria over a period of 12 days.

What is claimed is:

1. A method of inhibiting microbial growth in a wash water of a photoprocessing system comprising placing in the wash water of the photoprocessing system an apparatus comprising a pump for pumping the wash water having inlet means and outlet means for the wash water and; a permeable container holding biocide immobilised on a support, said permeable container being attached to said pump such that the wash water pumped through the pump passes through the container and contacts the immobilised biocide, and pumping the wash water through the container holding the biocide immobilised on said support.

2. A method according to claim 1 wherein the apparatus is submergable.

3. A method according to claim 1 wherein the permeable container is attached to the pump over the inlet means of the pump.

4. A method according to claim 1 wherein the biocide is immobilised on a particulate support.

5. A method according to claim 1 wherein the biocide has a log P value of at least 1.5, the support has a hydrophobic surface and the biocide is immobilized on the hydrophobic surface by hydrophobic exclusion.

6. A method according to claim 1 wherein the biocide is covalently bound to the support by a hydrolytically stable covalent linkage.

7. A method according to claim 1 wherein the support is a porous inorganic polymer network in which the biocide is immobilised.

8. A method according to claim 1 wherein the biocide is an isothiazolinone.

9. A photoprocessing system comprising a photoprocessor wash water tank and self-contained apparatus for inhibiting bacterial growth in the wash water tank, said apparatus comprising a pump for pumping wash water having inlet means and outlet means for the wash water and; a permeable container holding biocide immobilised on a support, said permeable container being attached to said pump such that the wash water pumped through the pump passes through the container and contacts the immobilised biocide thereby inhibiting microbial growth in the wash water.

* * * * *